United States Patent
Venkatachalam et al.

(10) Patent No.: US 9,386,617 B2
(45) Date of Patent: *Jul. 5, 2016

(54) DISCOVERY AND OPERATION OF HYBRID WIRELESS WIDE AREA AND WIRELESS LOCAL AREA NETWORKS

(71) Applicant: Intel Corporation, Santa Clara, CA (US)

(72) Inventors: Muthaiah Venkatachalam, Beaverton, OR (US); Puneet Jain, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,131

(22) Filed: Dec. 22, 2014

(65) Prior Publication Data

US 2015/0110052 A1    Apr. 23, 2015

Related U.S. Application Data

(63) Continuation of application No. 13/631,037, filed on Sep. 28, 2012, now Pat. No. 8,917,708.

(51) Int. Cl.
*H04W 4/00*     (2009.01)
*H04W 76/02*    (2009.01)
(Continued)

(52) U.S. Cl.
CPC ............ *H04W 76/023* (2013.01); *H04W 8/005* (2013.01); *H04W 84/04* (2013.01); *H04W 84/12* (2013.01)

(58) Field of Classification Search
CPC .... H04L 5/0048; H04W 4/008; H04W 8/005; H04W 76/023; H04W 84/12
See application file for complete search history.

(56) References Cited

U.S. PATENT DOCUMENTS 8,917,708 B2     12/2014  Venkatachalam
2004/0240440 A1*  12/2004  Wild et al. .................... 370/389
(Continued)

FOREIGN PATENT DOCUMENTS

WO    WO2004/001521 A2    12/2003
WO    WO 2011/130630 A1   10/2011

OTHER PUBLICATIONS

3GPP; 3$^{rd}$ Generation Partnership Project; Technical Specification Group Core Netword and Terminals; Numbering addressing and Identification; 3GPP TS 23.003 v11.2.0; Jun. 2006; 83 pages; Release 11.

(Continued)

*Primary Examiner* — Gregory Sefcheck
*Assistant Examiner* — Jenkey Van
(74) *Attorney, Agent, or Firm* — Thorpe North & Western LLP

(57) ABSTRACT

Technology for setting up a Device to Device (D2D) communication channel between mobile wireless devices is disclosed. The technology includes identifying a first user equipment and a second user equipment located within a proximity; receiving network assisted proximity discovery information at one of the first UE and the second UE from an evolved packet core (EPC) operating on a third generation partnership practice (3GPP) wireless wide area network (WWAN); and setting up a device to device (D2D) communication between the first UE and the second UE based on the network assisted proximity discovery information received from the EPC.

24 Claims, 10 Drawing Sheets

(51) Int. Cl.
*H04W 8/00* (2009.01)
*H04W 84/12* (2009.01)
*H04W 84/04* (2009.01)

(56) References Cited

U.S. PATENT DOCUMENTS

| | | | |
|---|---|---|---|
| 2007/0264991 A1 | 11/2007 | Jones et al. | |
| 2008/0144629 A1* | 6/2008 | Tomiyasu et al. | 370/392 |
| 2011/0082939 A1* | 4/2011 | Montemurro | H04W 76/023 709/227 |
| 2012/0077510 A1* | 3/2012 | Chen | H04W 28/26 455/452.1 |
| 2013/0034023 A1* | 2/2013 | Jung | H04L 67/104 370/255 |
| 2013/0150058 A1* | 6/2013 | Lim | H04W 72/048 455/450 |
| 2014/0004796 A1* | 1/2014 | Cakulev et al. | 455/41.2 |
| 2014/0031028 A1* | 1/2014 | Yamada et al. | 455/419 |

OTHER PUBLICATIONS

Mian et al.; A Survey of Service Discovery Protocols in Multihop Mobile Ad Hoc Networks; Pervasive Computing IEEE; Sep. 15, 2009; pp. 66-74; vol. 8, Issue 1; IEEE.

PCT application PCT/US2013/048020; filing date Jun. 27, 2013; Intel Corporation et al.; International Search Report and Written Opinion mailed on Sep. 27, 2013.

* cited by examiner

DISCOVERY AND OPERATION OF HYBRID WIRELESS WIDE AREA AND WIRELESS LOCAL AREA NETWORKS

RELATED APPLICATIONS

The present application is a continuation of U.S. patent application Ser. No. 13/631,037 filed on Sep. 28, 2012, the entire specification of which is hereby incorporated by reference in its entirety for all purposes.

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities. One projection estimates a growth of 20 times in mobile internet traffic from 2010 to 2015.

Improvements in wireless architectures, hardware design, and processor speed have significantly increased the efficiency of wireless devices in their use of the available spectrum. However, the ability to transmit a greater number of bits per second per hertz of available bandwidth may be reaching an upper limit with the currently available battery technology.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
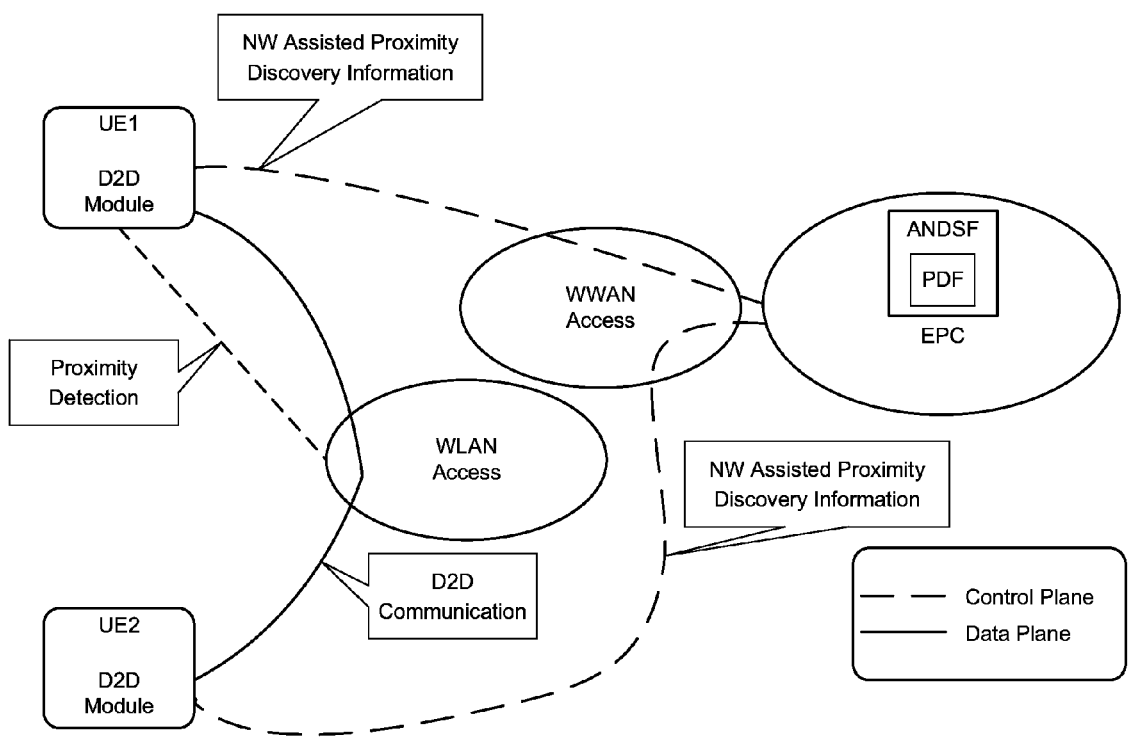
FIG. 1 illustrates a block diagram for proximity discovery over 3GPP for device to device (D2D) communication via a wireless local area network (WLAN) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term D2D refers to device to device communication. The device can be a wireless device capable of communicating in one or more radio frequency bands. The wireless device may be a mobile wireless device such as a smart phone, tablet, laptop, or other type of computing device. The wireless device may also be a simplified computing device, such as a sensor, that is configured to communicate wirelessly. Sensors that are configured to communicate wirelessly are often referred to as machines. The term D2D can be used synonymously herein with peer to peer (P2P) and machine to machine (M2M) communication.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An exponential increase in the amount of wireless data transmitted has created congestion in wireless wide area networks (WWANs) using licensed spectrum to provide wireless communication services for wireless devices such as smart phones and tablet devices, to name a few. The congestion is especially apparent in high density and high use locations such as urban locations and universities.

One technique for providing additional bandwidth capacity is to use low power wireless communication standards, such as wireless local area network (WLAN) standards to perform device to device (D2D) communication in licensed or unlicensed portions of the radio spectrum. The use of WLAN standards for D2D communication between devices can significantly decrease the amount of bandwidth used at potential choke points in a WWAN, such as eNodeBs and core network (CN) servers. Since D2D communication can reduce or eliminate communication via the eNodeB and/or CN, it can free the Radio Access Network (RAN) and CN to be used for communication over greater distances, such as in WWAN intercellular communication.

The term D2D communication can also be referred to as ProSe communication, which can be defined as a communication between two UEs in proximity by means of a communication path established between the UEs. The communication path can be established directly between the UEs or routed via local WWAN or WLAN network nodes.

A ProSe enabled UE is a Ue that supports ProSe Discovery and/or ProSe communication. A UE that is configured to perform D2D communication can be a ProSe enabled UE.

A ProSe enabled network is a network that supports ProSe Discovery and/or ProSe Communication.

ProSe group communication involves a one-to-many ProSe Communication, between two or more UEs in proximity, by means of a common communication path established between the UEs.

ProSe broadcast communication is a one-to-all ProSe Communication between all authorized UEs in proximity, by means of a common communication path established between the UEs.

Many types of wireless devices are capable of communicating via licensed spectrum, such as through a cellular network, and via unlicensed spectrum, such as via a WiFi hotspot. WiFi is a common name provided to an Institute of Electronics and Electrical Engineers (IEEE) 802.11 set of standards for communicating in unlicensed spectrum including the 2.4, 3.7 and 5 GHz frequency bands. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), and the 802.11n standard released in 2009 for communication in the 2.4 GHz and 5 GHz bands using multiple-input multiple-output (MIMO).

Standards such as WiFi or Bluetooth are used to provide wireless local area networks (WLAN) that can be accessed by dual mode devices that are also capable of accessing a cellular networking standard such as IEEE 802.16 standard, commonly referred to as WiMAX (worldwide interoperability for microwave access), and the third generation partnership project (3GPP). Releases of the IEEE 802.16 standard include the IEEE 802.16e-2005, 802.16-2009, and 802.16m-2011. Releases of the 3GPP standard include the 3GPP LTE, Release 8 in the fourth quarter of 2008, the 3GPP LTE Advanced Release 10 in the first quarter of 2011, and the pre-release of Release 11 in the first quarter of 2012.

However, some types of Wireless Wide Area Networks (WWAN) standards, such as the third generation partnership project (3GPP) Release 8, 9, 10, or 11, are not fully designed to provide D2D communication. Significant changes to the standards are needed for the physical layer (PHY), Medium Access Control (MAC) layer, support for D2D detection, distributed scheduling, and interference management.

One potential solution can be to use a WLAN standard to provide D2D communication between dual mode devices that include both WWAN radios and WLAN radios. For example, D2D communication can be accomplished using WLAN standards, such as Bluetooth or the Institute of Electronics and Electrical Engineers (IEEE) 802.11 or IEEE 802.15 standards. Of these standards, the IEEE 802.11 standard can be used to provide D2D communication over the greatest distance. However, depending on the desired system setup and architecture, a hybridized network comprised of a Wireless Wide Area Network (WWAN) and a Wireless Local Area Network (WLAN) may include D2D communication via Bluetooth or the IEEE 802.11 or IEEE 802.15 standards that can be assisted by the WWAN. Additional types of WLAN standards and other low power wireless communication standards may be used in as well.

In order for a wireless device to communicate directly or indirectly with another wireless device, three operations typically occur. First, information can be communicated between wireless devices that will assist in proximity discovery. This communication is typically routed via a WWAN or WLAN network. Second, proximity detection can occur between two devices, based on the proximity discovery information that is received. Third, a direct D2D communication link can be established between the wireless devices.

Prior to receiving the proximity discovery information, the wireless devices are typically not aware of each other, and thus are unable to communicate. One means for communicating the proximity discovery information is through the use of a separate communication channel. For example, a previously established network connection, such as a WWAN connection, can be used to communicate the proximity discovery information to at least two wireless devices that are within proximity of one another. For instance, a user equipment (UE) configured to operate using the WWAN 3GPP LTE standard or a mobile station (MS) configured to operate using the WWAN IEEE 802.16 standard can communicate proximity discovery information to the UE or MS via the WWAN.

As used herein, the term "proximity" is defined has a distance that enables two wireless devices to communicate via a direct D2D communication link. The actual distance depends on the type of communication used to form the D2D communication link. For instance, the IEEE 802.16n in the standard (Released in 2012) can communicate a greater distance than the IEEE 802.15.4-2006 standard.

A UE can be manually or automatically configured to be discoverable by other networks and/or UEs. The proximity of one UE relative to another UE can be determined based on location awareness in a WWAN network, such as the 3GPP Evolved Packet System (EPS) or an IEEE 802.16 configured WWAN. The ability to be discoverable by other networks and/or UEs enables a WWAN or WLAN network to inform two or more UEs when they are within proximity of one another.

The process of configuring a UE to be discoverable can be referred to as ProSe Discovery, which can be defined as a process that identifies that a UE is in proximity of another. A specific type of WWAN network, such as an evolved Universal Mobile Telecommunications System (UMTS) Terrestrial Radio Access Network (E-UTRAN) or other desired type of WWAN may be used to perform ProSe Discovery. ProSe Discovery may be either open or restricted. In open ProSe Discovery, then discovery can be accomplished without explicit permission from the UE being discovered. Restricted ProSe Discovery can take place only with explicit permission from the UE being discovered. The network with which the UE is discoverable can be referred to as a ProSe network.

The proximity discovery information can include information needed to allow at least two wireless devices, such as UEs, to communicate directly using device to device communication. For example, the proximity discovery information can include identification information of UEs in proximity to another UE, IP address, gateway, and subnet mask for adjacent UEs, and a selected channel on which to communicate. Additional, optional information may also be communicated. For example, a Peer to Peer (P2P) group id and a P2P interface Medium Access Control (MAC) address for each UE may also be communicated.

The proximity discovery information can be communicated to two UEs to provide information that can be used enable the UEs to directly communicate via a D2D communication. The proximity discovery information can be communicated when the UEs are members of the same public and mobile network (PLMN) or when they are members of different PLMNs. For example, a user of a first UE may be a subscriber at Operator A. A user of a second UE may be a subscriber at operator B. The proximity discovery information can be communicated to each of the first and second UEs when they are within proximity of each other, even when they are members of different PLMNs. The operator of each mobile network can authorize the UEs to discover other UEs that are members of other PLMNs.

In one embodiment, the operator can charge for the ability to discover UEs operating on other PLMNs. For instance, a monthly surcharge may be charged if a user wants to be able to detect and form D2D communication links with UEs in other PLMNs.

In one embodiment, one of the UEs can be selected as a group owner for D2D communication. The proximity detection information may be communicated via the WWAN to each UE that is in proximity to another UE. Alternatively, the WWAN can be used to communicate the proximity detection information to the group owner UE. The group owner UE can then use the proximity detection information to establish control channels with one or more UEs in proximity and send desired proximity discovery information to the adjacent UE(s).

The operations of network assisted proximity discovery, proximity detection, and D2D communication can be accomplished in a number of different ways, depending on system architecture and design. FIGS. 1-4 illustrate examples of different architectures that may be used for proximity discovery, detection, and D2D communication. These examples are not intended to be limiting. Additional architectures may also be used, as can be appreciated.

A brief discussion of 3GPP architecture is provided for context with respect to FIGS. 1-4. FIG. 5 provides an example of a 3GPP LTE network, as described in the 3GPP Release 8, 9, 10 and 11 specifications. In the 3GPP LTE network, UEs 550A-B can communicate with an Evolved Packet Core (EPC) 560 via a Radio Access Network (RAN) 510. The RAN can include transmission nodes such as the evolved universal terrestrial radio access (E-UTRAN or eUTRAN) or UTRAN modules, represented as the eNodeBs 512A and 512B. The RAN can be in communication with the EPC. The EPC can include a serving gateway (S-GW) 520 and a mobility management entity (MME) 530. The EPC can also include a packet data network (PDN) gateway (P-GW) 542 to couple the S-GW to a PDN, such as the Internet 580, an intra-net, or other similar network. External servers, such as a server 547 operated by a mobile network operator (MNO) can be connected outside the Evolved Packet System (EPS) via the P-GW. The S-GW can provide P2P internet network access and standard network access for the UEs associated with the RAN. The S-GW and MME can be in direct communication with each other via cabling, wire, optical fiber, and/or transmission hardware, such a router or repeater. The eNodeBs 512A-B are connected to the UEs 550A-B via an LTE radio link 515 A-B, respectively, in this example. A backhaul link 514, such as an X2 link, can be used to connect the eNBs. The X2 link is typically formed over a broadband wired or optical connection between the eNBs. Connections between the eNBs 512A-B, the S-GW 520, and the MME 530 can be made via S1 type connections 524A-B, and 526A-B. The S1 interface is described in 3GPP Technical Specification (TS) 36.410 versions 8 (2008 Dec. 11), 9 (2009 Dec. 10) and 10 (2011 Mar. 23), which are available to the public.

The EPC 560 can also include a Policy and Charging Rules Function (PCRF) node 544 that can be used to determine, in near real time, policy rules of a Mobile Network Operator (MNO) in the wireless network. The PCRF node can access subscriber databases and other specialized functions, such as charging systems, as can be appreciated. Additional policies can be added to identify, in near real time, when an MNO can configure a network to form a D2D connection between at least two wireless devices. As used herein, an MNO is a wireless network service provider. The wireless devices may both be in the MNO's network. Alternatively, one of the wireless devices may operate in another MNO's network.

The EPC 560 can also include an Access Network Discovery and Selection Function (ANDSF) 546. The purpose of the ANDSF is to assist the UEs 550A-B to discover non-3GPP access networks, such as IEEE 802.11 or IEEE 802.16, that can be used for data communications in addition to 3GPP access networks (such as HSPA or LTE) and to provide the UE with rules policing the connection to these networks.

With an understanding of the basic architecture of a 3GPP network, examples are provided of a variety of system architectures used to provide the operations of network assisted proximity discovery, proximity detection, and D2D communication, as illustrated in FIGS. 1-4.

In the example illustrated in FIG. 1, UE1 and UE2 are both configured to communicate with a WWAN. In this example, the WWAN access is based on the 3GPP LTE standard, including Releases 8, 9, 10 and 11. Network assisted proximity and discovery information can be communicated to UE1 and UE2 from the EPC via a control plane connection with the WWAN access. In this example embodiment, the WWAN access may be based on 3GPP. The 3GPP access may be provided by a RAN having at least one eNodeB, as previously discussed. The eNodeB can be a high power node, such as a macro node, that is configured to transmit and receive signals from UEs over a distance of multiple kilometers. Alternatively, the eNodeB may be a Low Power Node (LPN), such as a micro cell, a pico cell, a femto cell, a Home eNodeB, and so forth. The LPN can be configured to communicate with the UEs over a distance of less than one kilometer.

In one embodiment, a Proximity Detection Function (PDF) can be implemented in the 3GPP network in one or more of the following nodes, including: a) an eNodeB; b) an MME; c) an ANDSF; and d) a new proximity server in the mobile network operator (MNO). In FIG. 1, the PDF is illustrated as being located in the ANDSF, but this is not intended to be limiting. The PDF can be configured to communicate network assisted proximity discovery information to UE1 and UE2. The PDF may also be located at other nodes that allow the PDF to communicate with the UE(s) in a WWAN network. In one embodiment, the ANDSF can include a list of WLAN networks that may be available in the vicinity of a UE and information that can be used to assist the UEs to expedite the connection to the WLAN network(s).

The proximity discovery information can include information that can be used by the UEs to detect proximity and perform D2D communication via a WLAN. A D2D module located at each UE can be configured to communicate with the PDF in the 3GPP network or with the MNO.

In one embodiment, the proximity discovery information can include a group owner status. The group owner status can be identified and communicated from the PDF to a selected UE via the WWAN. The group owner status designates that a selected UE will be the master in a D2D communication with one or more other UEs. The group owner status may be determined by the PDF. The designation of one UE as a group owner may be based on signal strength of the UE with the RAN, the capabilities of the UE, selected at random between two or more UEs in the 3GPP network, or based on other desired metrics, as can be appreciated. The group owner UE can be configured to communicate using ProSe group communication with a plurality of other UEs on the D2D communication channel.

In one example, the network assisted proximity discovery information for the group owner can also include an identification value for UE1 and UE2 and a communication WLAN channel on which the D2D communication will take place. For example, the communication WLAN channel may be a channel selected for communication via an IEEE 802.11 communication standard, an IEEE 802.15 communication standard, a Bluetooth standard, or another WLAN standard used to form a D2D communication link between UE1 and UE2.

In one embodiment, the UE identification value for D2D discovery may be 3GPP specific or a new identity may be formed. Several examples of identification values are provided in the proceeding paragraphs. The examples are not intended to be limiting. Other types of UE identification values may also be used, as can be appreciated.

IMSI: International Mobile Subscriber Identity. In one example, UE2 can construct an SSID (service set identification) value using its IMSI. Since IMSI is required to have its confidentiality protected it may be encoded (or a new identity can be derived from the IMSI) using a unidirectional secure hash function. The confidentiality can be protected or a new identity derived in such a way that reverse engineering of IMSI is very difficult.

IMEI: International Mobile Station Equipment Identity. The IMEI format is defined by the 3GPP. For example, one definition is provided in section 6 of 3GPP Technical Specification (TS) 23.003 V11.2.0 (2012 June).

MAC ID: In this example, a beacon can include the MAC ID of UE2 that will be known to UE1. A security mechanism may need to be in place for confidentiality protection of the MAC ID, as previously discussed with respect to the IMSI.

MSISDN: Mobile Subscriber Integrated Services Digital Network-Number. This is the telephone number stored in a mobile communication device's subscriber identity module (SIM) card. The MSISDN number can be used as the UE ID. Longer length MSISDN than current 10 digit limit can be defined.

TMSI/P-TMSI/M-TMSI/S-TMSI/LMSI/TLLI: The temporary mobile subscriber identity (TMSI) is the identity that is most commonly sent between a wireless communication device and the network. The TMSI may be located in a packet switched domain (/p), The TMSI/M is a 32-digit binary number that is part of the globally unique temporary identity (GUTI) and is exclusively used in the evolved universal terrestrial radio access network (E-UTRAN). The TMSI/S consists of the mobility management entity code (MMEC) and M-TMSI. Indeed, it is just a shorter variant of the GUTI. The LMSI is the local mobile subscriber identity that can act as a pointer to a database record for a particular IMSI. The TLLI (temporary logical link identifier) is used in GSM and GPRS services. It provides the signaling address used for communication between the UE and the SGSN (Serving GPRS Support Node). Structure and format of these identities are defined in section 2 of 3GPP TS 23.003. These are various local identities assigned to the UE by the MSC/SGSN/MME. The TLLI (to use is built by the UE either on the basis of the P-TMSI (local or foreign TLLI), or directly (random TLLI). These local identities can be used in case both UEs belong to same operator and are present in same MSC/SGSN/MME area.

GUTI: the globally unique temporary UE identity (GUTI) format is defined in section 2.8 of 3GPP TS 23.003.

Access Network Identity: In certain D2D scenarios a device may act as an access network and may broadcast an access network identifier. In one embodiment, a new access network identity for D2D can be defined and used as the UE ID.

D2D-APN: A Dedicated D2D Access Point Name (D2D-APN) can be assigned to each UE.

New Identity: a new identity can be provided to the UEs for D2D discovery. This identity can be mapped internally to the IMSI for charging purpose. In one example, a new identity can be formatted based on a network access identifier (NAI), a uniform resource identifier (URI), or a fully qualified domain name (FQDN). The NAI/URI can be decorated using, for example, the IMSI, MSISDN, IMEI, MAC ID, or another desired identifier, as can be appreciated.

The network assisted proximity discovery information for the group owner can also include: a) a P2P Group Basic Service Set Identification (BSSID); b) a peer to peer (P2P) interface Medium Access Control (MAC) address for UE1 and a P2P interface MAC address for UE2. The P2P Group BSSID and P2P interface MAC address for each UE may optionally be derived from the UE1 ID and/or the UE2 ID. This will be discussed more fully in proceeding paragraphs.

In another example, the network assisted proximity discovery information for the non-group owner UE (i.e. the UE not designated as the group owner by the PDF) can include: a) the UE1 ID; b) the UE2 ID; c) a WLAN communication channel on which the D2D communication will take place; d) a P2P interface MAC address for UE1; and e) a P2P interface MAC address for UE2. As with the group owner, the P2P interface MAC addresses may be derived from the UE1 ID and UE2 ID.

Once the proximity detection information is received via the WWAN network, proximity detection can be performed based on the proximity discovery information received at each UE. For example, the group owner UE may scan for the other UE that was identified in the proximity discovery information. The UE may scan on the WLAN communication channel. The non-group owner UE can listen on the WLAN communication channel. In one embodiment, the group owner UE may transmit the P2P Group BSSID on the communication channel. The non-group owner UE can be configured to scan for the P2P Group BSSID on the WLAN communication channel.

In the example illustrated in FIG. 1, UE1, the group owner, can transmit the P2P Group BSSID via the WLAN to UE2. UE1 can then communicate with UE2 via the WLAN on the communication channel. The WLAN may be based on standards including Bluetooth, IEEE 802.11, IEEE 802.15, or another WLAN standard, as previously discussed.

Once the proximity discovery information has been communicated by the WWAN network to the UEs and the proximity detection has been performed on the control plane, a D2D communication link can be established between UE1 and UE2 in the data plane. In the example of FIG. 1, the D2D communication link is formed via the WLAN Access, which can act as the WLAN Access Point (AP). The WLAN AP can be either a trusted or untrusted WLAN AP.

Figure 2:
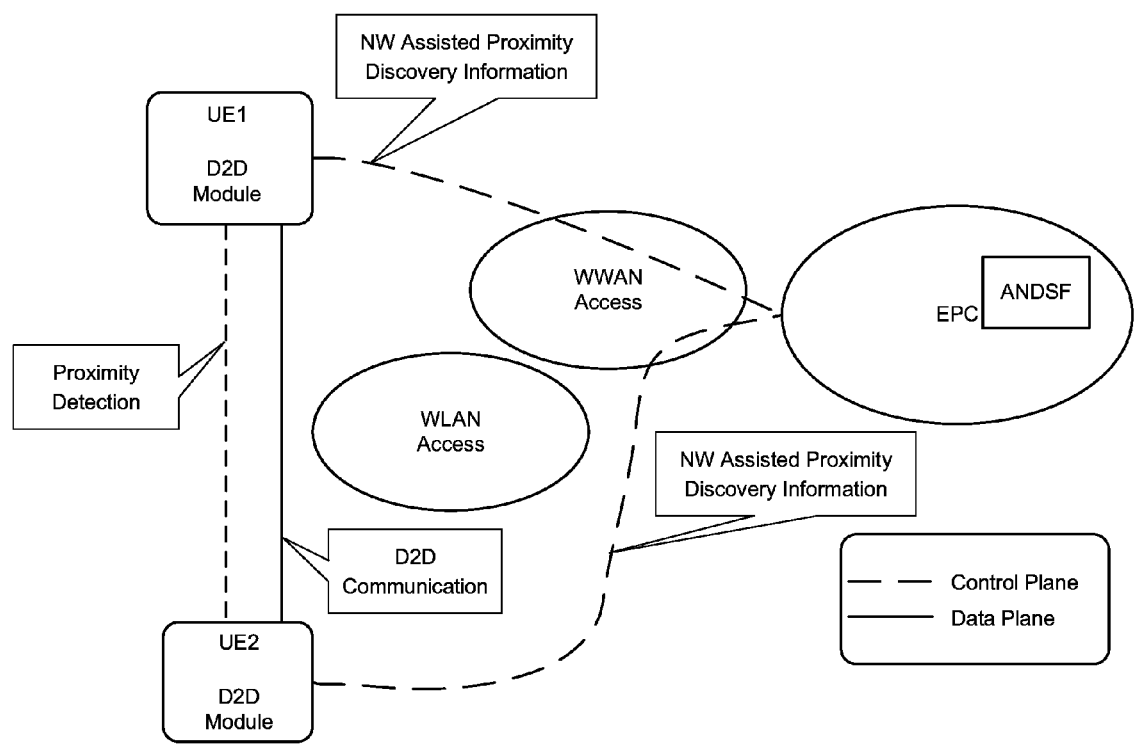
FIG. 2 illustrates a block diagram for proximity discovery over a 3GPP network for device to device (D2D) communication via a direct connection in accordance with an example.

FIG. 2 illustrates another example architecture to provide the operations of network assisted proximity discovery, proximity detection, and D2D communication. In the example of FIG. 2, the network assisted proximity discovery information can be communicated to the group owner UE (i.e. UE1) and the non-group owner UE (i.e. UE2) as was previously discussed, with respect to FIG. 1. Alternatively, UE2 may be assigned as the group owner and UE1 may be the non-group owner, as previously discussed. The proximity detection operation in FIG. 2 can be performed directly between UE1 and UE2 via a control plane connection.

For example, using Wi-Fi Direct or Bluetooth, UE1, the group owner, can scan on the WLAN communication channel that was previously received in the proximity discovery information and UE2 can listen on the WLAN communication channel that was received in the proximity discovery information to confirm the proximity. In one embodiment, UE1 may transmit the P2P Group BSSID directly to UE2 via the WLAN communication channel. UE2 can scan for the P2P Group BSSID on the WLAN communication channel. A P2Pinterface MAC address can then be constructed at UE1 and UE2 using the UE1 ID and UE2 ID, respectively. UE1 can then communicate directly with UE2 using Wi-Fi Direct, Bluetooth, or another WLAN D2D interface via a data plane connection. The type of D2D interface used to form the direct D2D communication between UE1 and UE2 can be identified based on the information received during the network assisted proximity discovery information transfer.

Figure 3:
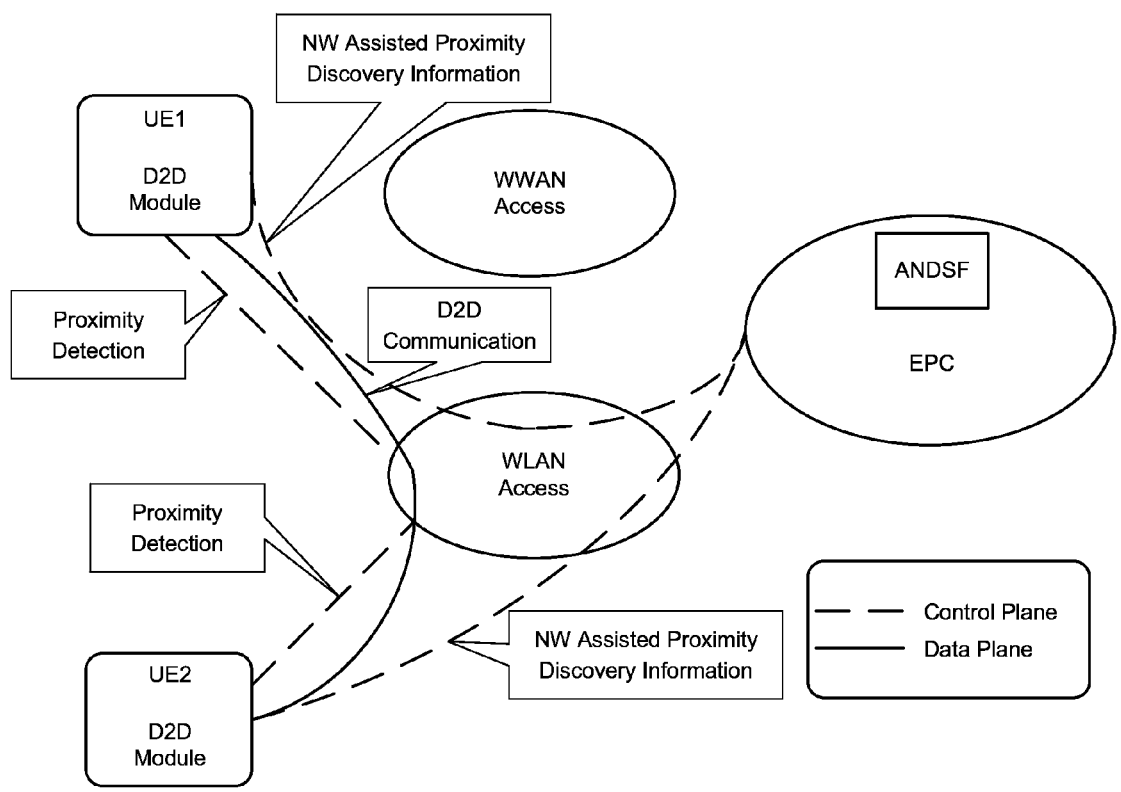
FIG. 3 illustrates a block diagram for proximity discovery over a non-3GPP network for device to device (D2D) communication over a WLAN in accordance with an example.

FIG. 3 illustrates an additional example architecture to provide the operations of network assisted proximity discovery, proximity detection, and D2D communication. In the example of FIG. 3, the network assisted proximity discovery information can be communicated to the group owner UE (i.e. UE1 or UE2) and the non-group owner UE (i.e. UE2 or UE1). In this example, the network assisted proximity discovery information can be communicated via a WLAN access point. Both UEs can be previously configured to communicate with the WLAN access point. The WLAN access point can be configured to communicate directly with the EPC, as shown in FIG. 3. In one example, the WLAN access point can be directly integrated with the WWAN access point. For instance, an IEEE 802.11 access point (AP) can be integrated with an eNodeB. The integration of the AP and the eNB can allow the UEs to communicate with the EPC in a control plane connection with the EPC, as illustrated in FIG. 3. The network assisted proximity discovery information communicated via the WLAN access point can include the same information previously discussed with respect to FIG. 1.

The proximity detection operation can be performed between UE1 and UE 2 via the WLAN Access point, as illustrated in FIG. 3. For example, using Wi-Fi Direct, Bluetooth, IEEE 802.15, or another WLAN communication scheme, UE1, the group owner, can scan on the WLAN communication channel that was previously received in the proximity discovery information and UE2 can listen on the WLAN communication channel that was received in the proximity discovery information to confirm the proximity. In one embodiment, UE1 may transmit the P2P Group BSSID directly to UE2 via the WLAN communication channel. UE2 can scan for the P2P Group BSSID on the WLAN communication channel. A P2Pinterface MAC address can then be constructed at UE1 and UE2 using the UE1 ID and UE2 ID, respectively. UE1 can then communicate directly with UE2 using Wi-Fi Direct, Bluetooth, IEEE 802.15 or another WLAN D2D interface to form a data plane connection. The type of D2D interface used to form the D2D communication between UE1 and UE2 via the WLAN access point can be identified based on the information received during the network assisted proximity discovery information transfer. In FIG. 3, the D2D communication channel is formed via the WLAN access point. For instance, the WLAN access point may be an IEEE 802.11 AP that can be used to form a data plane connection between UE1 and UE2 to enable the D2D communication. A trusted or untrusted AP may be used to host the D2D communication.

Figure 4:
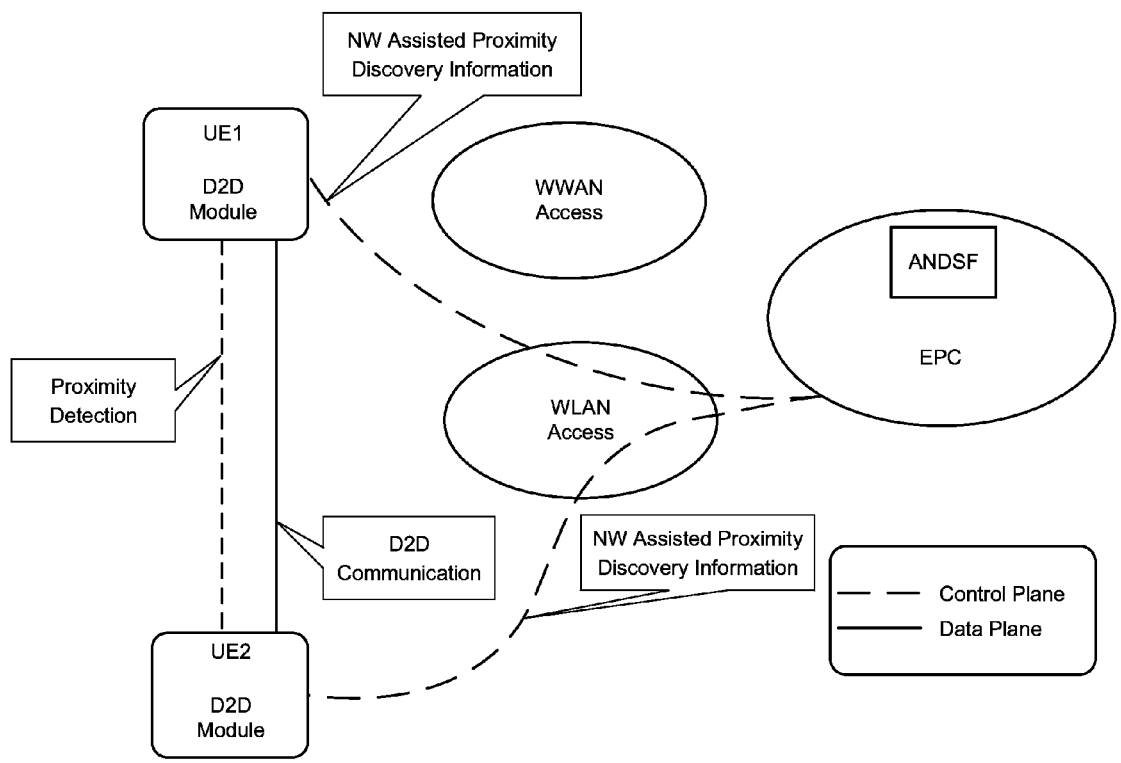
FIG. 4 illustrates a block diagram for proximity discovery over a non-3GPP network for device to device (D2D) communication via a direct connection in accordance with an example.
Figure 5:
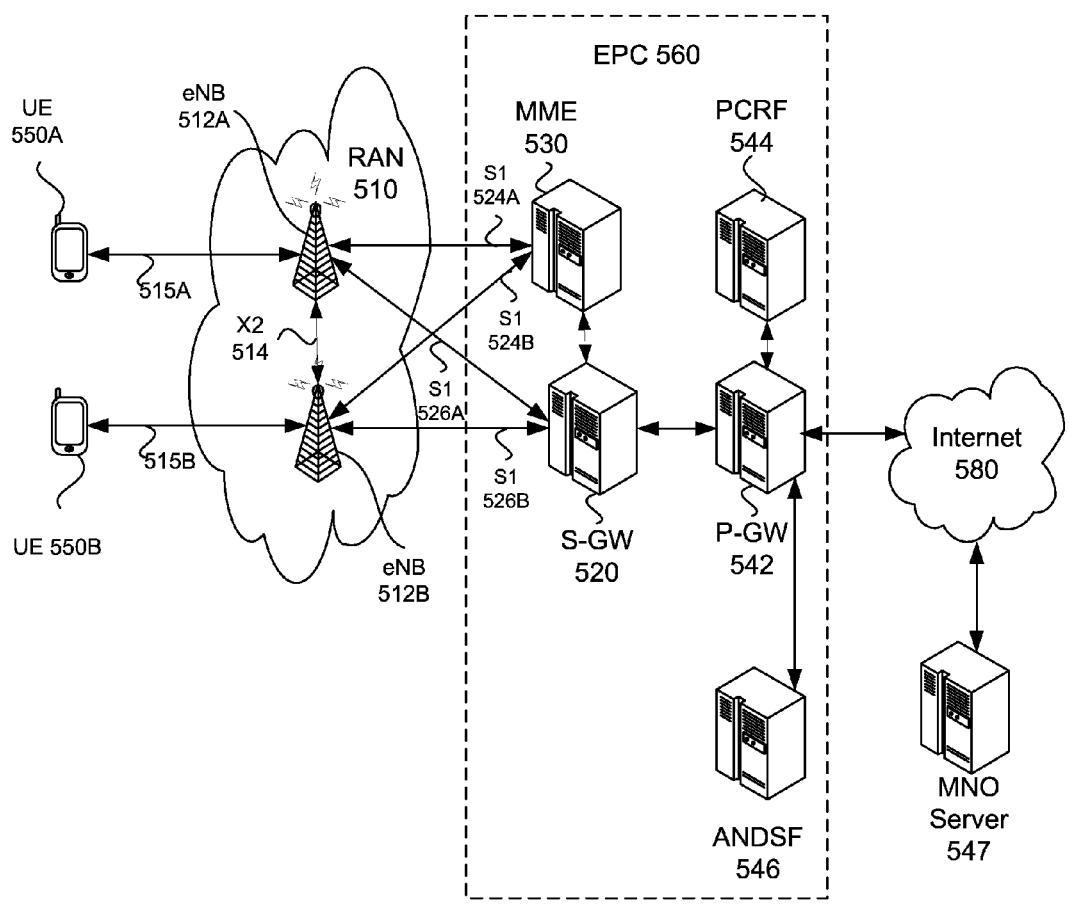
FIG. 5 illustrates a block diagram providing an example of communication in a third generation partnership project (3GPP) long term evolution (LTE) network.

FIG. 4 provides yet another example architecture to provide the operations of network assisted proximity discovery, proximity detection, and D2D communication. In the example of FIG. 4, the network assisted proximity discovery information can be communicated to the group owner UE (i.e. UE1 or UE2) and the non-group owner UE (i.e. UE2 or UE1) via a control plane communication. In this example, the network assisted proximity discovery information can be communicated via a control plane communication with a WWAN access point such as an eNodeB, as previously discussed in the example architectures of FIGS. 1 and 2. The WWAN access point, such as the eNodeB can be configured to communicate directly with the EPC, as shown in FIG. 4. The network assisted proximity discovery information communicated via the WWAN access point can include the same information previously discussed with respect to FIG. 1. The proximity detection operation in FIG. 4 can be performed directly between UE1 and UE2 in the control plane.

For example, using Wi-Fi Direct or Bluetooth, UE1, the group owner, can scan on the WLAN communication channel that was previously received in the proximity discovery information and UE2 can listen on the WLAN communication channel that was received in the proximity discovery information to confirm the proximity. In one embodiment, UE1 may transmit the P2P Group BSSID directly to UE2 via the WLAN communication channel. UE2 can scan for the P2P Group BSSID on the WLAN communication channel. A P2Pinterface MAC address can then be constructed at UE1 and UE2 using the UE1 ID and UE2 ID, respectively. UE1 can then communicate directly with UE2 using Wi-Fi Direct, Bluetooth, or another WLAN D2D interface via the data plane. The type of D2D interface used to form the direct D2D communication between UE1 and UE2 can be identified based on the information received during the network assisted proximity discovery information transfer.

Figure 6:
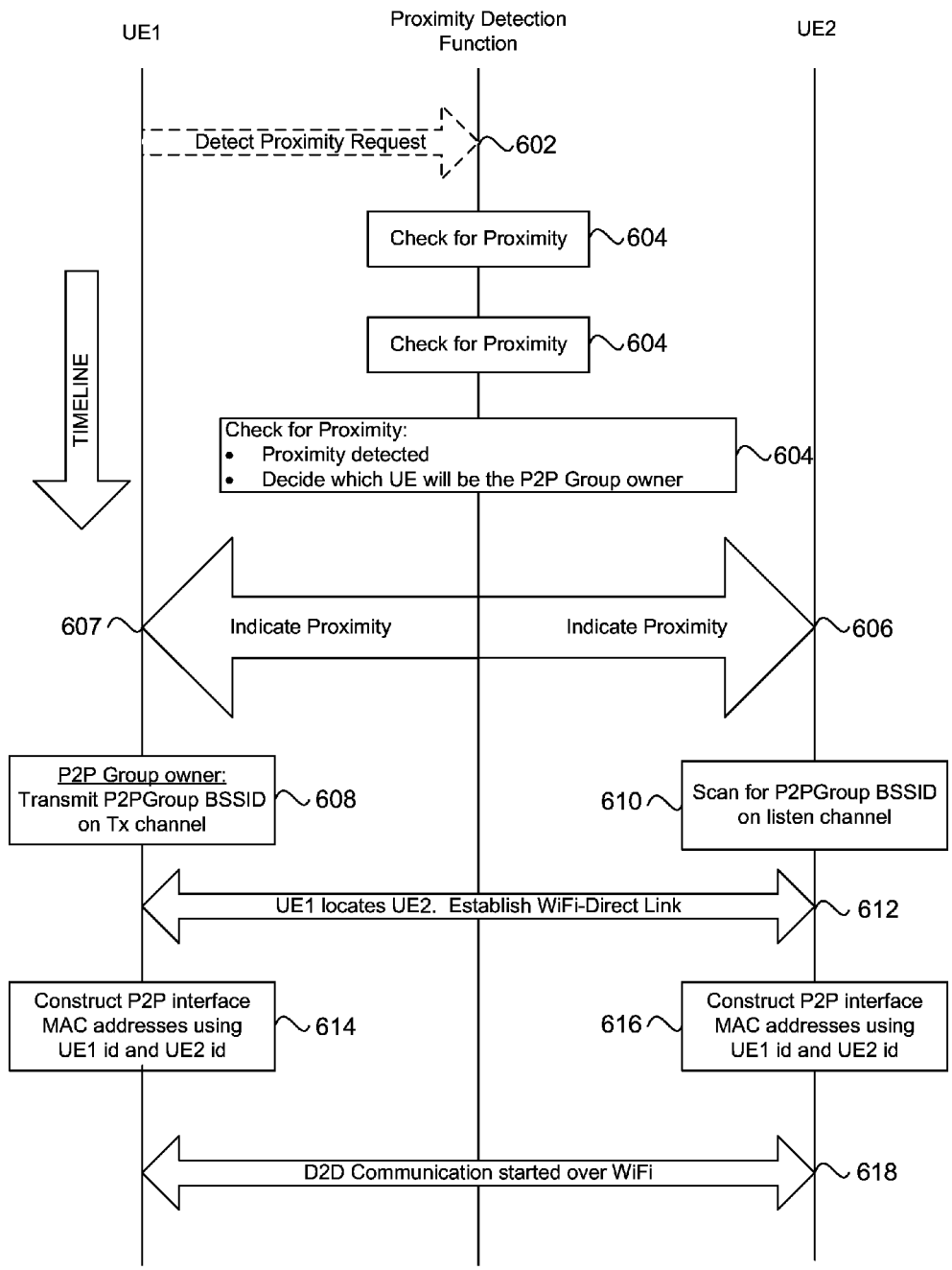
FIG. 6 illustrates a flow diagram for a pull model of proximity discovery via a 3GPP WWAN connection in accordance with an example.

FIG. 6 illustrates an example flow diagram for proximity discovery via a 3GPP WWAN connection, as illustrated in FIG. 2. The flow diagram of FIG. 6 represents a pull model, in which UE1 can request the proximity detection function to check for proximity. It is to be noted that the 3GPP network can decide which UE of the two UEs is the group owner.

In the flow diagram of FIG. 6, a first UE, such as UE1 in this example, can request the Proximity Detection Function (PDF) to detect proximity 602. As previously discussed, the PDF may be located at an eNodeB, an MME, an ANDSF, a proximity server in the MNO, or another node that allows the PDF to communicate with the UE(s) in a WWAN network. Upon reception of the request, the PDF can periodically check for proximity 604. The rate of the periodicity depends on system design and operator choice. A check for proximity may be made at a rate from every few milliseconds, to every few seconds. In this example, three checks for proximity are illustrated. However, this is not intended to be limiting. Any number of checks for proximity may be performed.

In one embodiment, a WWAN that is configured based on the 3GPP LTE specification can be used to provide the information needed to allow UE1 and UE2 to identify that they are within proximity. This information can be communicated via various different protocols depending on where the PDF is implemented.

For example, when the PDF is located at the eNB then radio resource control (RRC) messaging can be used. When the PDF is located at the MME then communication via an S1-access point from the MME to the RAN can be used, followed by RRC messaging from the eNB in the RAN to each UE. Alternatively, When the PDF is located in the MME then the non-access stratum (NAS) layer may be used to communicate with UE1 and UE2. When the PDF is located in the ANDSF then a device management protocol specified by the open mobile alliance (OMA) can be used to communicate between the PDF and each UE. When the PDF is located in a server, such as an over the top (OTT) server that is operational in the MNO core, then a programming language may be used that is based on a standardized specification, such as hyper text transfer protocol (HTTP), extensible markup language (XML), simple object access protocol (SOAP), or another desired language.

When another UE is identified as having a location that is within proximity of the requesting UE then the PDF can determine which of the UEs that are within proximity of each other will be designated as the P2P Group owner. As previously discussed, the selection of a UE as the P2P Group owner may be based on signal strength of a UE with the RAN, the capabilities of a UE, the selection may be made at random between two or more UEs in the 3GPP network, or the selection may be based on other desired metrics, as can be appreciated.

In steps 606 and 607, proximity can be indicated to each UE. The indication of proximity can include the Network Assisted Proximity Discovery Information to the Group owner 606 and non-Group owner 607, as previously discussed with respect to FIGS. 1-4.

In step 608, the P2P Group owner (UE 1 in this example) can transmit a P2PGroup BSSID on the WLAN communication channel. Information regarding the WLAN communication channel was received in step 607. In one embodiment, the P2PGroup BSSID can be communicated as part of the P2P information element (IE) to help UE2 discover it over a WiFi-Direct connection. In step 610, the non-Group owner, UE2, can scan for the P2PGroup BSSID on the WLAN communication channel. Information regarding the WLAN communication channel was received in step 606. Alternatively, the P2PGroup BSSID may be sent by the 3GPP network or may be constructed using the identity of UE1 (UE1 ID) that is provided by the 3GPP network. The UE1 ID can be known a-priori by UE2.

In step 612, UE1 can locate UE2 and a direct link, such as a WiFi-Direct link, can be established between UE1 and UE2. In the process of establishing a WiFi-Direct link, UE1 and UE2 can construct a P2P interface MAC address using the UE1 ID and the UE2 ID that is communicated during steps 607 and 606, respectively, as shown in steps 614 and 616. The P2P interface MAC address can be a virtual MAC address that can be derived from the UE ID that is sent by the 3GPP network. Alternatively, the P2P interface MAC address can be explicitly communicated by the 3GPP network to both UEs. Using the P2P interface MAC address, D2D communication between UE1 and UE2 can be started, as shown in block 618.

Figure 7:
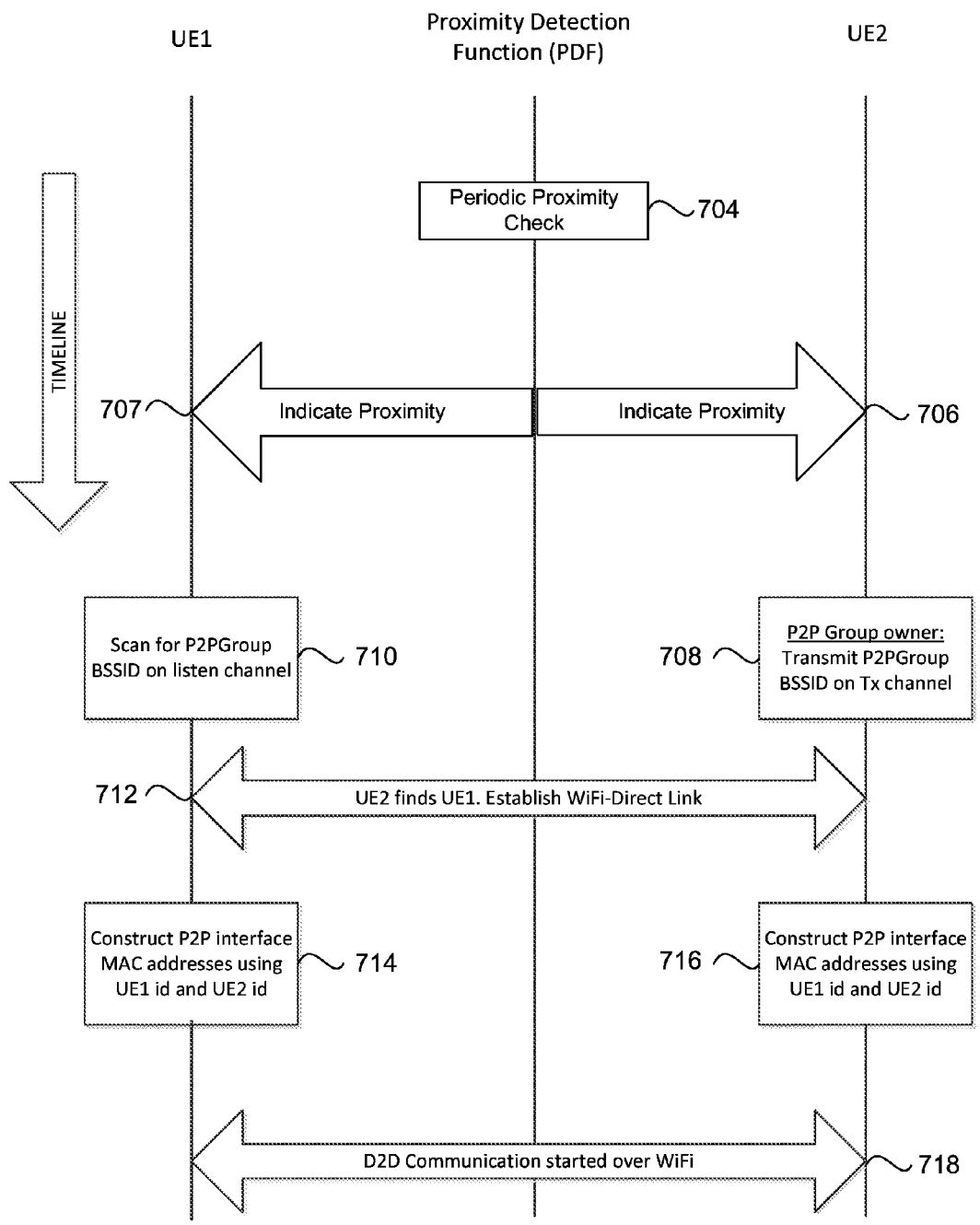
FIG. 7 illustrates a flow diagram for a push model of proximity discovery via a 3GPP WWAN connection in accordance with an example.

FIG. 7 illustrates another example flow diagram for proximity discovery via a 3GPP WWAN connection, as illustrated in FIG. 2. The flow diagram of FIG. 7 represents a push model, in which the PDF can identify when proximity occurs and push the information to the UEs that are located within a proximity of one another.

In the example of FIG. 7 then the PDF can be configured to perform periodic proximity checks 704 to identify when UEs may be located within a proximity of one another, as previously discussed. Once proximity has been identified, the PDF can determine which UE should be designated as the P2P Group owner. In this example, UE2 is designated as the P2P Group owner. In step 706, the network assisted proximity discovery information for the P2P Group owner is communicated to UE2. The proximity discovery information for the non-Group owner is communicated to UE1 in step 707.

In step 708, the P2P Group owner, UE2, can then transmit the P2PGroup BSSID on the WLAN communication channel, based on information received in step 706. The non-Group owner, UE 1, can then scan for the P2PGroup BSSID on the WLAN communication channel, based on information received in step 707.

In step 712, UE2 can locate UE1 and establish a WiFi-Direct link. In steps 714 and 716, UE1 and UE2 can construct a P2P interface MAC address using the UE1 ID and UE2 ID received in steps 707 and 706, respectively. Once the P2P interface MAC address has been constructed, then D2D communication can be started, as shown in step 718.

While the example flow diagrams of FIGS. 6 and 7 have included examples that construct a WiFi-Direct D2D connection between UE1 and UE2, this is not intended to be limiting. D2D connections may also be formed using other WLAN specifications, including but not limited to, Bluetooth and IEEE 802.15 based specifications, as previously discussed.

In one embodiment, a user equipment (UE) configured to setup a device to device (D2D) communication is disclosed. The UE comprises a device to device (D2D) module operating on the UE and configured to communicate with a proximity detection function (PDF) module in communication with a third generation partnership project (3GPP) wireless wide area network. The D2D module is configured to: receive an indication from the PDF module that another UE is located within proximity of the UE; receive network assisted proximity discovery information from the PDF module that can be used to establish a D2D communication with the other UE, including a D2D communication channel; receive a peer to peer (P2P) group owner status from the PDF module; and setup the D2D communication on the D2D communication channel with the other UE using the network assisted proximity discovery information based on the P2P group owner status.

The D2D module operating on the UE can be further configured to: transmit a peer to peer (P2P) group (P2PGroup) basic service set identification (BSSID) on a WLAN communication channel of the D2D communication channel when receiving a status of P2P group owner; and scan for the P2PGroup BSSID on the D2D communication channel when receiving a status of P2P non-group owner.

The D2D module can also be configured to construct a peer to peer (P2P) interface medium access control (MAC) address for the UE and for the other UE. The D2D module can also be configured to construct the P2P interface MAC using a UE identification (ID) value for the UE and a UE ID value for the other UE.

In one embodiment, the UE ID value for the UE and for the other UE can be constructed based on at least one of the international mobile subscriber identity (IMSI), international mobile-station equipment identity (IMEI), media access control (MAC) identification (ID), mobile subscriber integrated services digital network-number (MSISDN), temporary mobile subscriber identity (TMSI), globally unique temporary identity (GUTI), local mobile subscriber identity (LMSI), temporary logical link identifier (TLLI), access network identity (ASN), D2D access point name (APN), and a new identity mapped to the IMSI for charging purposes.

In another embodiment, the D2D module can be configured to setup a D2D communication with the other UE using the P2P interface MAC address to allow the UE and the other UE to communicate via the D2D communication. The D2D module can be configured to setup the D2D communication on the D2D communication channel with the other UE to enable the UE to communicate with the other UE without the use of an eNodeB in the WWAN or a wireless local area network (WLAN) access point.

Figure 8:
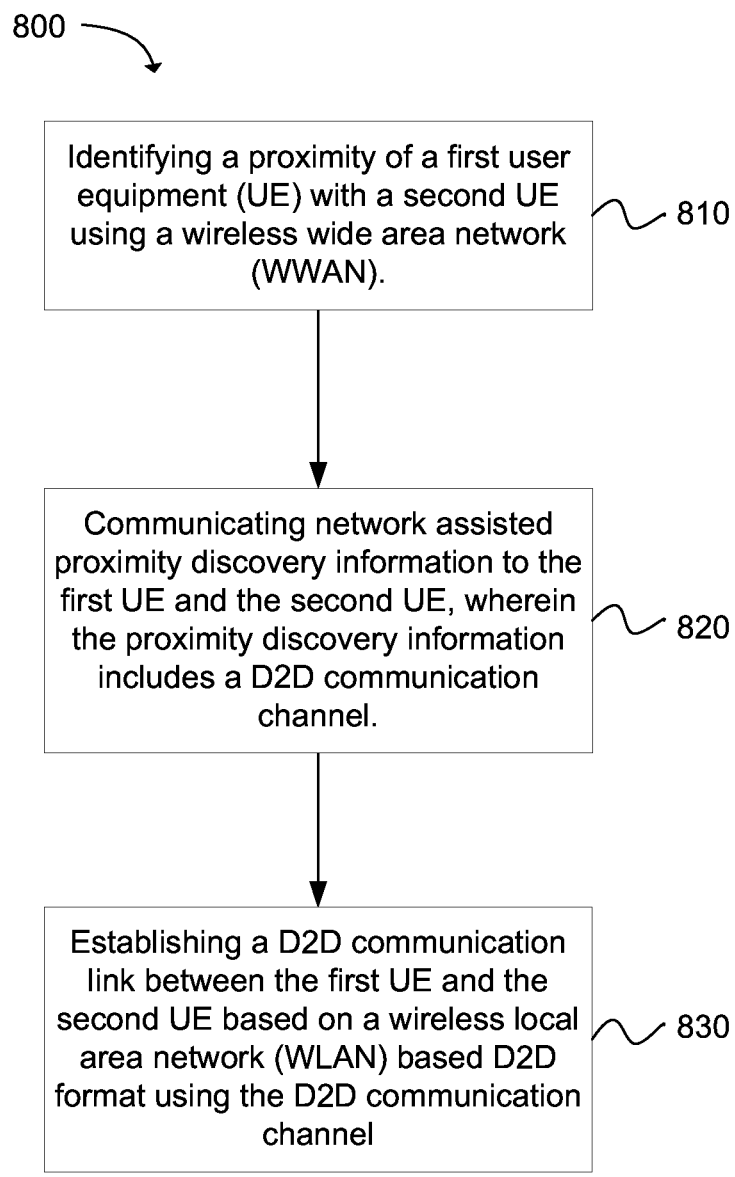
FIG. 8 illustrates a flow chart depicting a method for establishing device to device (D2D) communication in a hybrid wireless network in accordance with an example.

FIG. 8 provides a flow chart depicting a method 800 for establishing device to device (D2D) communication in a hybrid wireless network. The method includes the step of identifying a proximity of a first user equipment (UE) with a second UE using a wireless wide area network (WWAN), as shown in block 810. Network assisted proximity discovery information can be communicated to the first UE and the second UE, as shown in block 820. The proximity discovery information can include a D2D communication channel on which the D2D connection between the first UE and the second UE can be setup. A D2D communication link between the first UE and the second UE can be established using on a wireless local area network (WLAN) based D2D format at the D2D communication channel.

The method 800 can further comprise the operation of identifying the proximity of the first UE and the second UE using a WLAN in communication with the WWAN. An additional operation includes selecting one of the first UE and the second UE to be a peer to peer (P2P) group owner using a proximity detection function (PDF).

In one embodiment, an identification for the first UE (UE1 ID) and the second UE (UE2 ID) can be created based on at least one of the international mobile subscriber identity (IMSI), international mobile-station equipment identity (IMEI), media access control (MAC) identification (ID), mobile subscriber integrated services digital network-number (MSISDN), temporary mobile subscriber identity (TMSI), globally unique temporary identity (GUTI), local mobile subscriber identity (LMSI), temporary logical link identifier (TLLI), access network identity (ASN), D2D access point name (APN), and a new identity mapped to the IMSI for charging purposes.

A peer to peer (P2P) interface medium access control (MAC) address can be constructed. The MAC address can be a virtual MAC address that is derived from the UE1 ID and the UE2 ID to establish the D2D communication link between the first UE and the second UE.

Proximity between the first UE and the second UE can be detected using the network assisted proximity discovery information received at the first UE and the second UE via the WWAN, wherein the WWAN is a third generation partnership project (3GPP) Release 8, 9, 10 or 11 based WWAN. In one embodiment, the proximity between the first UE and the second UE can be detected by transmitting a peer to peer group (P2PGroup) basic service set identification (BSSID) from one of the first UE and the second UE that is selected to be a peer to peer (P2P) group owner and scanning for the P2PGroup BSSID by one of the first UE and the second UE that is not selected to be the P2P group owner.

The method 800 can also include the operation of transmitting a P2PGroup BSSID on the D2D communication channel and scanning for the P2PGroup BSSID on the D2D communication channel.

The operation of communicating network assisted proximity discovery information can further comprise transmitting to one of the first UE and the second UE that is selected as group owner: a group owner status selected by a proximity detection function; an identification (ID) value (UE ID); and a D2D communication channel center frequency and bandwidth.

The operation of communicating network assisted proximity discovery information to the group owner can further comprise communicating: a peer to peer group (P2PGroup) basic service set identification (BSSID); a peer to peer (P2P) interface medium access control (MAC) address for the UE selected as the group owner; and a P2P interface MAC address for one of the first UE and the second UE that is not selected as the group owner. In one embodiment, the P2P interface MAC address for each UE is derived from a UE identification (ID) value derived for that UE.

In another embodiment, network assisted proximity discovery information can be transmitted to one of the first UE and the second UE that is not selected as group owner. The information sent to the non-group owner can include: a group owner status selected by a proximity detection function; a user equipment (UE) identification (ID) value; and a D2D communication channel center frequency and bandwidth. Additional information that can be sent to the non-group owner can also include: a peer to peer (P2P) interface medium access control (MAC) address for the UE selected as the group owner; and a P2P interface MAC address for one of the first UE and the second UE that is not selected as the group owner.

Figure 9:
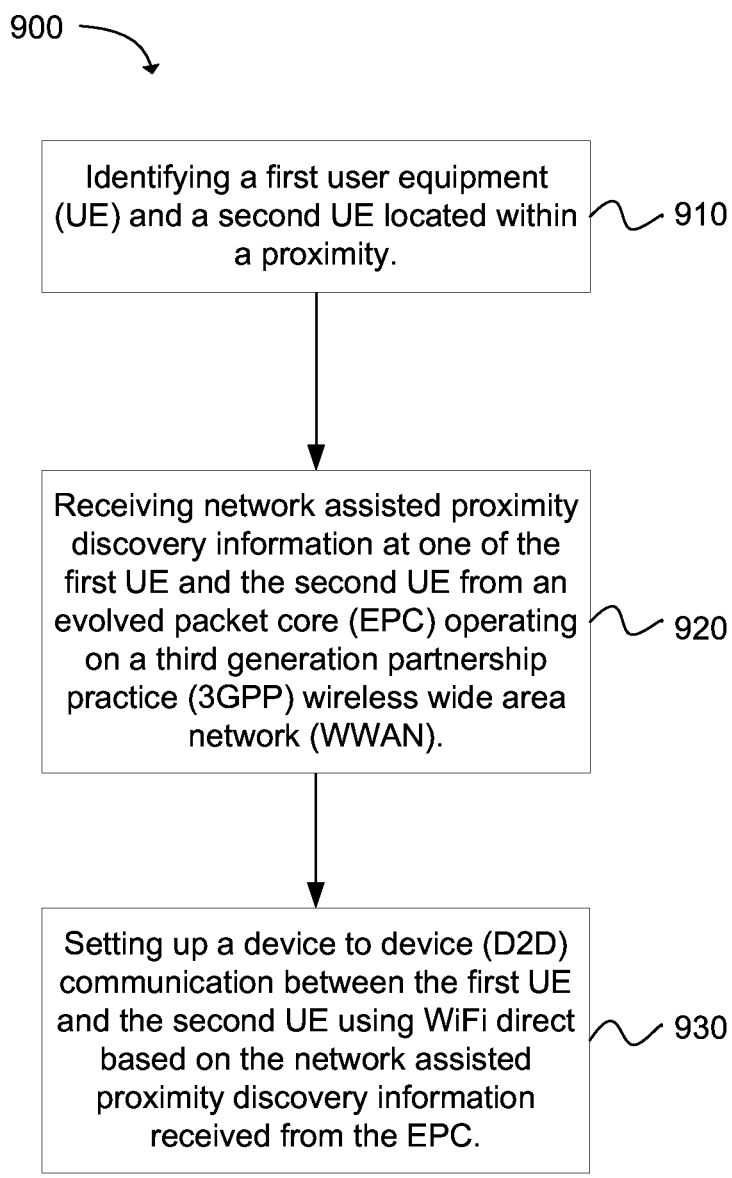
FIG. 9 illustrates a flow chart depicting a method for establishing a device to device (D2D) communication network in accordance with an example.

In another embodiment, a method 900 for establishing a device to device (D2D) communication is disclosed, as depicted in the flow chart of FIG. 9. The method comprises the operation of identifying a first user equipment and a second user equipment located within a proximity, as shown in block 910. An additional operation includes receiving network assisted proximity discovery information at one of the first UE and the second UE from an evolved packet core (EPC) operating on a third generation partnership practice (3GPP) wireless wide area network (WWAN), as shown in block 920. A further operation involves setting up a device to device (D2D) communication between the first UE and the second UE using WiFi direct based on the network assisted proximity discovery information received from the EPC, as shown in block 930.

The method 900 can further comprise receiving the network assisted proximity discovery information at one of the first UE and the second UE from a proximity discovery function (PDF) module operating on one of a mobility management entity (MME) and an Access Network Discovery and Selection Function (ANDSF) operating in the EPC.

A peer to peer (P2P) interface medium access control (MAC) address for the first UE and for the second UE can be constructed. A first UE ID value for the first UE and a second UE ID value for the second UE can also be constructed. Each UE ID value is constructed based on at least one of the international mobile subscriber identity (IMSI), international mobile-station equipment identity (IMEI), media access control (MAC) identification (ID), mobile subscriber integrated services digital network-number (MSISDN), temporary mobile subscriber identity (TMSI), globally unique temporary identity (GUTI), local mobile subscriber identity (LMSI), temporary logical link identifier (TLLI), access network identity (ASN), D2D access point name (APN), and a new identity mapped to the IMSI for charging purposes.

In one embodiment, a peer to peer (P2P) interface medium access control (MAC) address that is a virtual MAC address can be derived from the first UE ID and the second UE ID to establish the D2D communication link between the first UE and the second UE.

Figure 10:
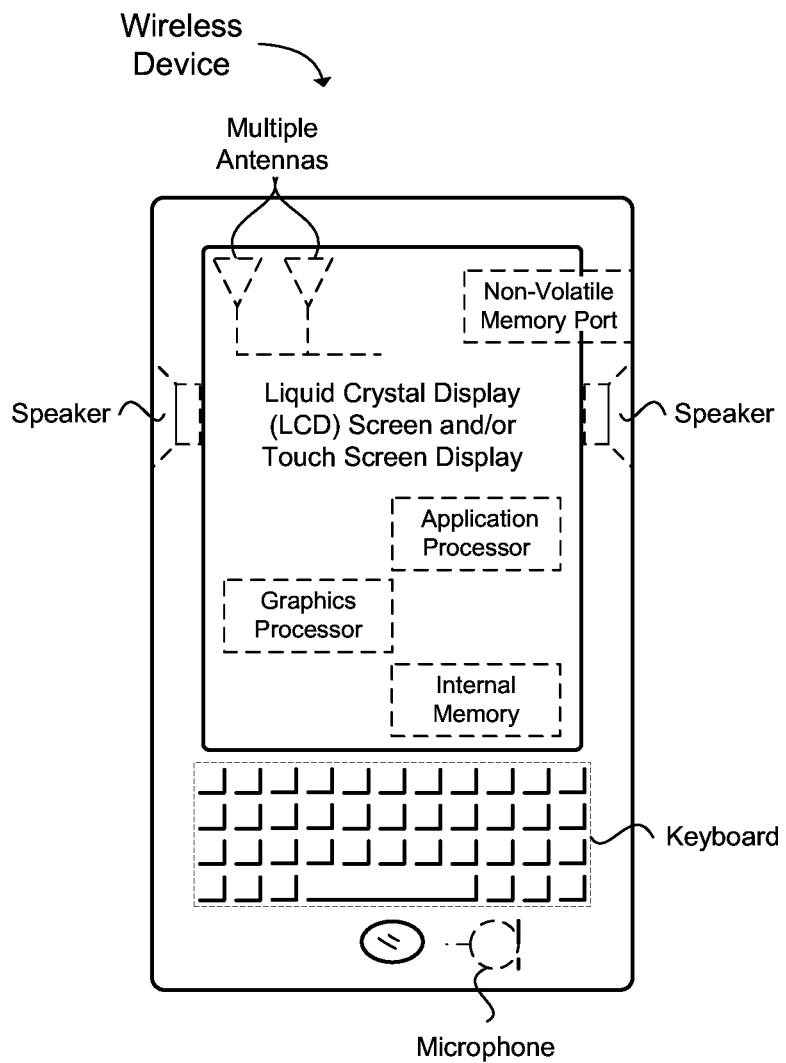
FIG. 10 illustrates a mobile wireless device in accordance with an example.

FIG. 10 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 10 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in non-transitory tangible media, such as floppy diskettes, CD-ROMs, hard drives, solid state drives, solid state memory, or any other machine-readable storage medium wherein, when the program code is loaded into and executed by a machine, such as a computer, the machine becomes an apparatus for practicing the various techniques. The term non-transitory includes any type of tangible media. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a first user equipment (UE) operable to perform peer to peer (P2P) communications in a wireless local area network (WLAN), the apparatus comprising one or more processors to cause the first UE to:
identify assistance information from an evolved packet core (EPC) that indicates the first UE is located within close proximity of a second UE, wherein the assistance information includes a basic service set identification (BSSID), a group owner status, and a communication channel for P2P discovery and communication;
establish a direct connection with the second UE that is in close proximity to the first UE, wherein the direct connection is established based on the group owner status and the BSSID included in the assistance information; and
send a P2P communication to the second UE on the communication channel using the direct connection between the first UE and the second UE.

2. The apparatus of claim 1, wherein the one or more processors further cause the first UE to:
transmit a P2P information element (IE) that includes the BSSID on the communication channel when the group owner status received from the EPC indicates that the first UE is a group owner; and
establish the direct connection with the second UE that receives the P2P IE on the communication channel from the first UE.

3. The apparatus of claim 1, wherein the one or more processors further cause the first UE to:
receive a P2P information element (IE) that includes the BSSID on the communication channel when the group owner status received from the EPC indicates that the first UE is not a group owner; and
establish the direct connection with the second UE that transmits the P2P IE on the communication channel to the first UE.

4. The apparatus of claim 1, wherein the first UE is associated with a P2P link layer address when included in a P2P group.

5. The apparatus of claim 1, wherein the BSSID is generated using a first identifier associated with the first UE and a second identifier associated with the second UE.

6. The apparatus of claim 5, wherein the first identifier is created using a first international mobile subscriber identity (IMSI) of the first UE and the second identifier is created using a second IMSI of the second UE.

7. The apparatus of claim 1, wherein the first UE is a ProSe enabled and WLAN-capable UE.

8. The apparatus of claim 1, wherein the first UE includes an antenna, a touch sensitive display screen, a speaker, a microphone, a graphics processor, an application processor, an internal memory, or a non-volatile memory port.

9. A first user equipment (UE) operable to perform peer to peer (P2P) communications in a wireless local area network (WLAN), the first UE comprising one or more processors configured to:
identify assistance information from an evolved packet core (EPC) that indicates the first UE is located within close proximity of a second UE, wherein the assistance information includes a basic service set identification (BSSID), a group owner status, and a communication channel for P2P discovery and communication;
establish a direct connection with the second UE that is in close proximity to the first UE, wherein the direct connection is established based on the group owner stares and the BSSID included in the assistance information; and
send a P2P communication to the second UE on the communication channel using the direct connection between the first UE and the second UE.

10. The first UE of claim 9, wherein the one or more processors are further configured to:
transmit a P2P information element (IE) that includes the BSSID on the communication channel when the group owner status received from the EPC indicates that the first UE is a group owner; and
establish the direct connection with the second UE that receives the P2P IE on the communication channel from the first UE.

11. The first UE of claim 9, wherein the one or more processors are further configured to:
receive a P2P information element (IE) that includes the BSSID on the communication channel when the group owner status received from the EPC indicates that the first UE is not a group owner; and
establish the direct connection with the second UE that transmits the P2P IE on the communication channel to the first UE.

12. At least one non-transitory machine readable storage medium having instructions embodied thereon for performing peer to peer (P2P) communications at a first user equipment (UE), the instructions when executed cause the first UE to perform the following:
identifying, using at least one processor of the first UE, assistance information that indicates the first UE is located within close proximity of a second UE in a wireless local area network (WLAN), wherein the assistance information includes a service set identification (BSSID), a group owner status, and a communication channel for P2P discovery and communication;
establishing, using the at least one processor of the first UE, a direct connection with the second UE that is in close proximity to the first UE, wherein the direct connection is established based on the group owner status and the BSSID included in the assistance information; and
sending, using the at least one processor of the first UE, a P2P communication with the second UE on the communication channel using the direct connection between the first UE and the second UE.

13. The at least one non-transitory machine readable storage medium of claim 12, further comprising instructions which when executed by the at least one processor of the first UE performs the following:
transmitting a P2P information element (IE) that includes the BSSID on the communication channel when the group owner status received from the EPC indicates that the first UE is a group owner; and
establishing the direct connection with the second UE that receives the P2P IE on the communication channel from the first UE.

14. The at least one non-transitory machine readable storage medium of claim 12, further comprising instructions which when executed by the at least one processor of the first UE performs the following:
receiving a P2P IE that includes the BSSID on the communication channel when the group owner stares received from the EPC indicates that the first UE is not a group owner; and
establishing the direct connection with the second UE that transmits the P2P IE on the communication channel to the first UE.

15. The at least one non-transitory machine readable storage medium of claim 12, wherein the first UE is associated with a P2P link layer address when included in a P2P group.

16. The at least one non-transitory machine readable storage medium of claim 12, wherein the BSSID is generated using a first identifier associated with the first UE and a second identifier associated with the second UE, wherein the first identifier is created using a first international mobile subscriber identity (IMSI) of the first UE and the second identifier is created using a second IMSI of the second UE.

17. The at least one non-transitory machine readable storage medium of claim 12, further comprising instructions which when executed by the at least one processor of the first UE performs the following: receiving the assistance information that indicates the first UE is located within close proximity of the second UE in the WLAN from a ProSe network element in an evolved packet core (EPC).

18. An apparatus of a ProSe network element operable to initiate peer to peer (P2P) communications in a wireless local area network (WLAN), the apparatus comprising one or more processors to cause the ProSe network element to:
    detect a close proximity of a first user equipment (UE) with a second UE in the WLAN; and
    trigger P2P discovery and communication between the first UE and the second UE by sending assistance information to each of the first UE and the second UE, the assistance information including a communication channel, a service set identification (BSSID), and a group owner status for each of the first UE and the second UE,
    wherein the first UE or the second UE is configured to establish a direct connection with one of the first UE or the second UE based on the group owner stares and the BSSID included in the assistance information received at the first UE or the second UE,
    wherein the first UE or the second UE is configured to perform a P2P communication on the communication channel with one of the first UE or the second UE using the direct connection between the first UE and the second UE.

19. The apparatus of claim 18, wherein the one or more processors further cause the ProSe network element to generate a P2P link layer address for at least one of the first UE or the second UE.

20. The apparatus of claim 18, wherein the first UE is associated with a P2P link layer address when included in a P2P group.

21. The apparatus of claim 18, wherein the SSID is generated using a first identifier associated with the first UE and a second identifier associated with the second UE.

22. The apparatus of claim 18, wherein the first identifier is created using a first international mobile subscriber identity (IMSI) of the first UE and the second identifier is created using a second IMSI of the second UE.

23. The apparatus of claim 18, wherein the first UE and the second UE that receive the assistance information are Pro Se enabled and WLAN-capable UEs.

24. The apparatus of claim 18, wherein the ProSe network element is included in an evolved packet core (EPC).

* * * * *